United States Patent
Sheriff

[19]

[11] Patent Number: 6,065,430
[45] Date of Patent: May 23, 2000

[54] FISH CULTURING SYSTEM

[76] Inventor: Richard L. Sheriff, 1829 Harbor Dr., Chester, Pa. 21619

[21] Appl. No.: 08/948,606

[22] Filed: Oct. 10, 1997

[51] Int. Cl.$^7$ .................................................. A01K 63/00
[52] U.S. Cl. ............................................................ 119/227
[58] Field of Search ................................ 119/226, 227, 119/228, 232

[56] References Cited

U.S. PATENT DOCUMENTS

| | | | |
|---|---|---|---|
| 3,661,262 | 5/1972 | Sanders | 119/227 |
| 3,888,210 | 6/1975 | Buss | 119/226 |
| 4,030,450 | 6/1977 | Hoult | 119/227 |
| 4,043,299 | 8/1977 | Birbeck et al. | 119/227 |
| 4,211,183 | 7/1980 | Hoult | 119/227 |
| 4,414,919 | 11/1983 | Hess | 119/226 |
| 4,427,548 | 1/1984 | Quick, Jr. | 119/227 |
| 4,806,237 | 2/1989 | Ewald, Jr. | 119/227 |
| 4,861,465 | 8/1989 | Augustyniak | 119/227 |
| 4,892,651 | 1/1990 | Hill | 343/853 |
| 4,951,606 | 8/1990 | Hartung | 119/227 |
| 5,158,037 | 10/1992 | Engelbart | 119/226 |
| 5,290,437 | 3/1994 | Lin | 119/226 |
| 5,450,818 | 9/1995 | Caillouet | 119/226 |
| 5,560,318 | 10/1996 | Yoshida et al. | 119/227 |

*Primary Examiner*—Michael J. Carone
*Assistant Examiner*—Elizabeth Shaw
*Attorney, Agent, or Firm*—Richard C. Littman

[57] ABSTRACT

A fish culturing system including a fish culture tank using opposed water flows, and including a water purification unit using only compressed air to power the system. The fish culture tank uses two opposing flows of water which enable solids to be removed continuously by a waste manifold at the base of the tank on two elongated sides, as well as at the surface of the water by a central overflow manifold. Water flow is developed by use of air diffusers located just above the waste manifolds in conjunction with the opposed water flows generated by two water returns. Waste water flows to a water purification unit having a clarifier, a biofilter, and air uplift tube system. The clarifier has a plurality of baffles in a lower sloped region that slows water velocity, allowing for settling of suspended solids. A lower screen further facilitates this settling. A middle settling region, topped by another screen, completes the settling process. An upper overflow region provided with a clarifier overflow trough skims clarified water from the surface, and passes it to the biofilter via gravity. A sparge arm directs water through a filter bed having nitrifying bacteria on to the air uplift tube system. A series of tubes connect the biofilter to the water manifolds of the culture tank. Each tube is, at its lower end, connected to an air hose. Air bubbles aerate and lift water upwards through the tube and into the water manifold leading to the culture tank.

15 Claims, 4 Drawing Sheets

FISH CULTURING SYSTEM

BACKGROUND OF THE INVENTION

1. Field of the Invention

The present invention relates to a fish culturing system. More specifically, the present invention relates to a fish culturing system employing a culture tank with opposing water flows and a separate water purification unit that recycles water back to the culture tank via air lift tubes. The entire system is powered only by compressed air.

2. Description of Related Art

As more and more people are consuming fish to achieve health benefits, demand for commercially raised fish has increased. To meet this demand, a fish culturing system that is inexpensive and efficient to use is needed. Additionally, it is beneficial to have such a system indoors, rather than exposed to the elements.

To meet this increased demand and minimize space needed for the operation, the number of fish grown in a certain volume of water must be maximized. In increasing the number of fish per certain volume, several concerns must be addressed. Increased fish population means increased demand for oxygen from the same volume of water. Aeration of the water helps increase levels of dissolved oxygen for use by fish, thereby allowing an increase in the fish population. Of course increased population means increased feeding and increased waste production. Excess food and waste in the water begin to break down producing ammonia, which is toxic to fish even at low levels of concentration. Frequent water changes help alleviate this problem, but are costly and wasteful of the natural resource. Reuse and recycling of the water is therefore not only desirable, but environmentally and economically mandated. Water in the tank contains toxic levels of ammonia and suspended solids from fish wastes and food residues. Thus filters have been developed that remove suspended solids from the water by physical means, and convert deadly ammonia to harmless nitrate by biological filtration, before returning water back to the tank.

These filtering systems generally pump water from a rearing tank through an area having increased surface area harboring bacteria which convert the deadly ammonia to harmless nitrate, while a filter bed traps suspended solids before returning the water to the tank.

U.S. Pat. No. 3,888,210 which issued to Buss on Jun. 10, 1975, discloses a fish husbandry system utilizing at least partial recirculation of water. The system uses an inner and outer hood to deliver fresh water and recirculated water to the fish tank, after having passed through a filter. The water flows, by gravity, from the rearing tank to the filter, where it is reconditioned, before it is pumped back to the rearing tank via a water pump.

U.S. Pat. No. 4,806,237 issued to Ewald, Jr. on Feb. 21, 1989, discloses a waste removal apparatus. The device includes a tank through which water from a fish culture system may be circulated. Filters mounted in upright and spaced relation cross the tank so that the water circulates successively through them. Tubes are provided for injecting air into the water on the upstream side of each filter.

U.S. Pat. No. 4,427,548 which issued to Quick, Jr. on Jan. 24, 1984, discloses a filtering method and apparatus. The apparatus operates by pumping water from a process tank and passing it in a trickle filter fashion through an open-cell polymeric foam material.

U.S. Pat. No. 4,951,606 which issued to Hartung on Aug. 28, 1990, discloses a fish tank for intensive fish fattening and process for operating such a fish tank. The tank includes a pit into which a filter with vertically extending flow channels is placed. Water, along with air is circulated through these flow channels where the water is purified (nitrified) biologically according to the adhesive activated-sludge process.

U.S. Pat. No. 4,043,299 which issued to Birbeck, et al. one Aug. 23, 1977, discloses a fish rearing system. The system recycles water through a primary biological filter after which the water is aerated and returned to the rearing tank.

U.S. Pat. No. 4,892,651 which issued to Hill on Jan. 9, 1990, discloses a filtering system for fish ponds. The filter system includes chambers for harboring micro-organisms which clean organic waste from the water flowing through from the pond. A by-pass is included so that individual chambers may be taken out of line for cleaning. An air supply is also provided for supplying air to the micro-organisms.

U.S. Pat. No. 4,414,919 which issued to Hess on Nov. 15, 1983, discloses a flowdown rearing pond. The rearing pond includes a water recycling and filtering system, using a buoyant filter bed.

U.S. Pat. No. 4,211,183 which issued to Hoult on Jul. 8, 1980, discloses an apparatus including a fish tank having a biological filter submerged within the tank.

U.S. patent No. which issued to Engelbart on Oct. 27, 1992, discloses a device for raising aquatic animals. An apparatus with aerating devices arranged in pools or ponds producing a bubble curtain without creating turbulence in the water.

Although efforts have been made in the past to alleviate the concerns involved in raising fish in large numbers, the need still exists for a culture system that draws waste from surface and submerged locations, recycles and recirculates water, while aerating and nitrifying the water, efficiently and economically, without the additional costs of a water pump and its use.

None of the above inventions and patents, taken either singly or in combination, is seen to describe the instant invention as claimed.

SUMMARY OF THE INVENTION

The present invention is a fish culturing system including a fish culture tank using opposed water flows, and including a water purification unit, using only compressed air to power the system. The fish culture tank uses two opposing flows of water which enable solids to be removed continuously by a waste manifold at the base of the tank on each of two elongated sides, as well as at the surface of the water by a central overflow manifold. Water flow is developed by use of air diffusers located just above the waste manifolds in conjunction with the opposed water flows generated by two water returns.

Waste water flows to a water purification unit having a clarifier, a biofilter, and air uplift tube system. The clarifier has a plurality of baffles in a lower sloped region that slows water velocity, allowing for settling of suspended solids. A lower screen further facilitates this settling. A middle settling region, topped by another screen, completes the settling and screening process. An upper overflow region provided with a clarifier overflow trough skims clarified water from the surface, and passes it to the biofilter via gravity.

A sparge arm, at the upper part of the biofilter, directs water through a filter bed having nitrifying bacteria on to the air uplift tube system. A series of tubes connect the biofilter to the water manifolds of the culture tank. Each tube is, at its lower end, connected to an air hose. Air bubbles aerate and lift water upwards through the tube and into the water manifold leading to the culture tank.

In this manner, compressed air is used not only to aerate the water, which helps provide more dissolved oxygen in the water to support more fish, but also to simultaneously power the entire system, by pumping water from the water purification unit to the tank in efforts to recycle and reuse water. All other water flows rely on gravity and siphon action. The need for an additional, and costly, water pump is therefore negated.

Accordingly, it is a principal object of the invention to provide a system for raising large quantities of fish in a small volume of water.

It is another object of the invention to provide a system for recycling water used in the culturing system.

It is a further object of the invention to provide a system powered only by compressed air and gravity.

Still another object of the invention is to provide a culture tank with two opposed water flows.

Another object of the invention is to provide a water purification unit having a clarifier and a biofilter.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a fish culturing system 10, having a culture tank 20 and a water purification unit 100. The culture tank 20 and water purification unit 100 are connected by a series of pipes, including an air uplift tube system.

Figure 1:
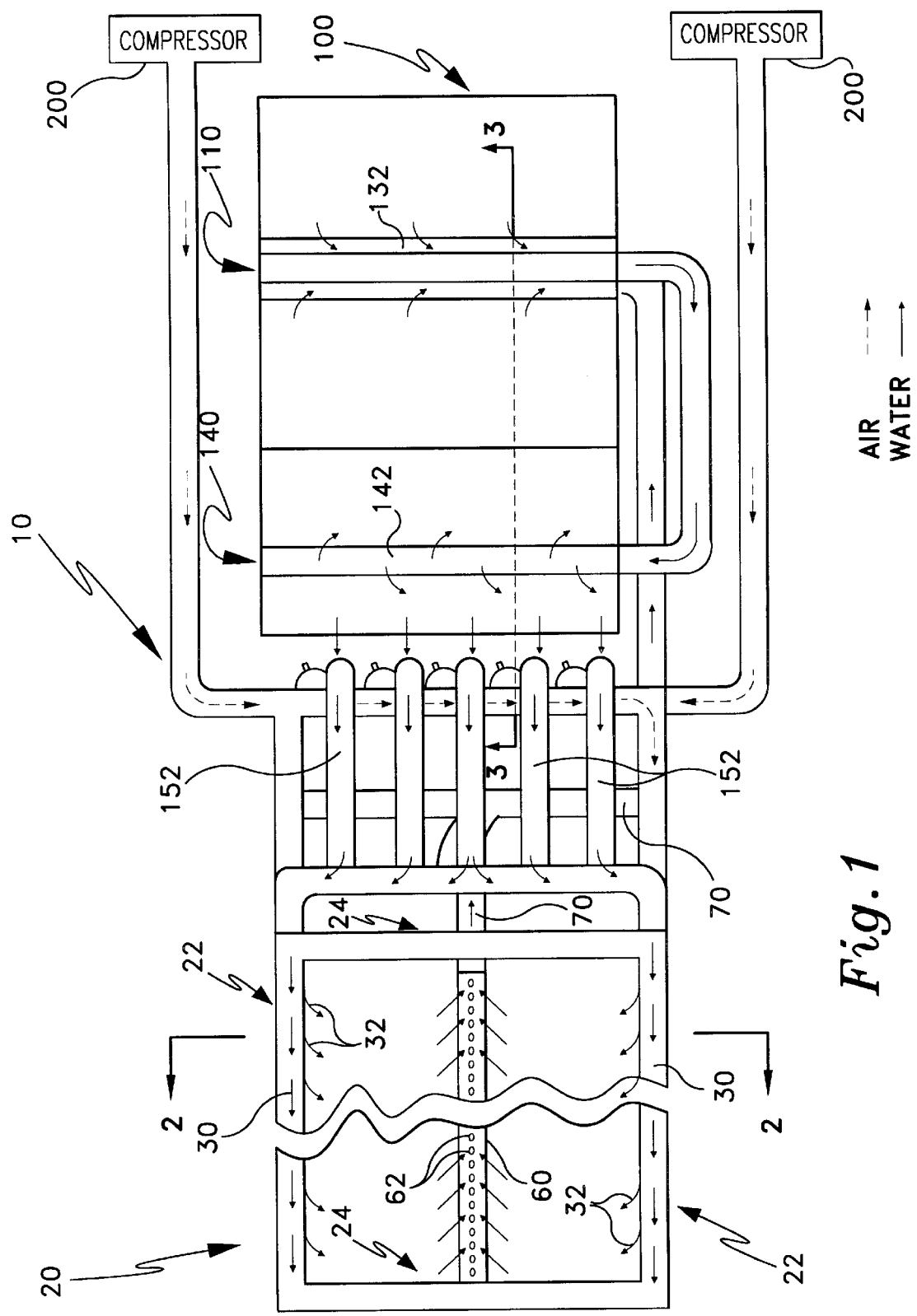
FIG. 1 is a diagrammatic plan view of the fish culturing system of the present invention.
Figure 2:
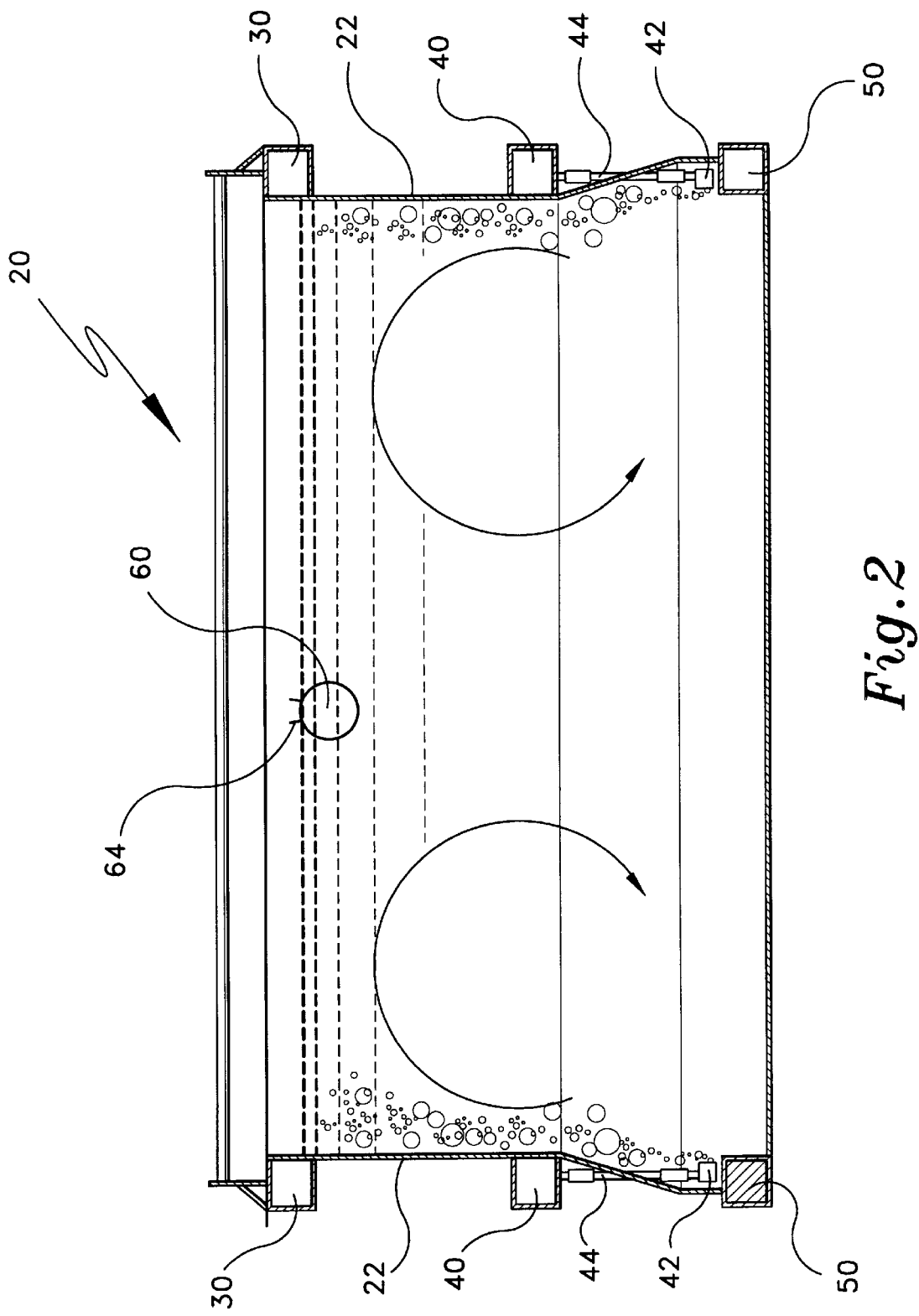
FIG. 2 is a cross sectional view of the culture tank of the present invention, as viewed along line 2—2 of FIG. 1.

The culture tank 20 is designed for housing and raising fish. The tank is made of two opposed elongated sides 22 and two opposed shorter sides 24, which connect the opposed elongated sides 22. The four sides are attached to a flat bottom, creating a reservoir for holding water and fish with an open top. This reservoir is shown fragmented in FIG. 1 to indicate indefinite size and volume.

Each elongated side 22 has three manifolds, a water return manifold 30, an air manifold 40, and a waste output manifold 50. The water return manifold 30 runs along the upper edge of each elongated side 22. This manifold 30 fluidly connects to the air uplift tube system which provides clean water from the water purification unit 100. Each water return manifold 30 is provided with a plurality slits 32 which force water toward the center of the tank in opposition to the flow generated by the opposing water return manifold 30. These opposed flows push floating debris toward the center of the tank, and heavier deposits to the outer edges of the tank bottom.

The air manifold 40 is in fluid connection with a source of compressed air 200, such as a conventional air compressor or compressed air tank. The air manifolds 40 are located on the exterior of the tank, at approximately one third the height of the tank. Each of a plurality of air diffusers 42 are connected to the air manifold 40 by a hose 44 having a control valve 46. The diffusers are located in the tank, near the bottom along each elongated side 22. The diffusers inject air into the culture tank 20, simultaneously aerating the water and creating a circular water flow by carrying water upwards.

Finally, a lateral lower waste output manifold 50 is located on and extending the entire length of the bottom edge of each elongated side 22. A plurality of open slots 52 draw waste materials and waste water to a waste output pipe 70 which connects the culture tank 20 to the input of the water purification unit 100.

The culture tank 20 is also provided with a suspended central waste overflow manifold 60 in fluid connection with the waste output pipe 70. The suspended overflow manifold 60 has a plurality of slots 62 for drawing in waste material and water directed by the current pushing from both sides toward the center. Baffles 64 are also used for directing water flow over the manifold 60 and preventing waste material from escaping the manifold 60 back into the tank.

Waste water and materials leave the culture tank 20 through the suspended central overflow manifold 60 and the two bottom lateral waste manifolds, all of which connect to the waste output pipe 70 leading to the water purification unit 100.

Figure 3:
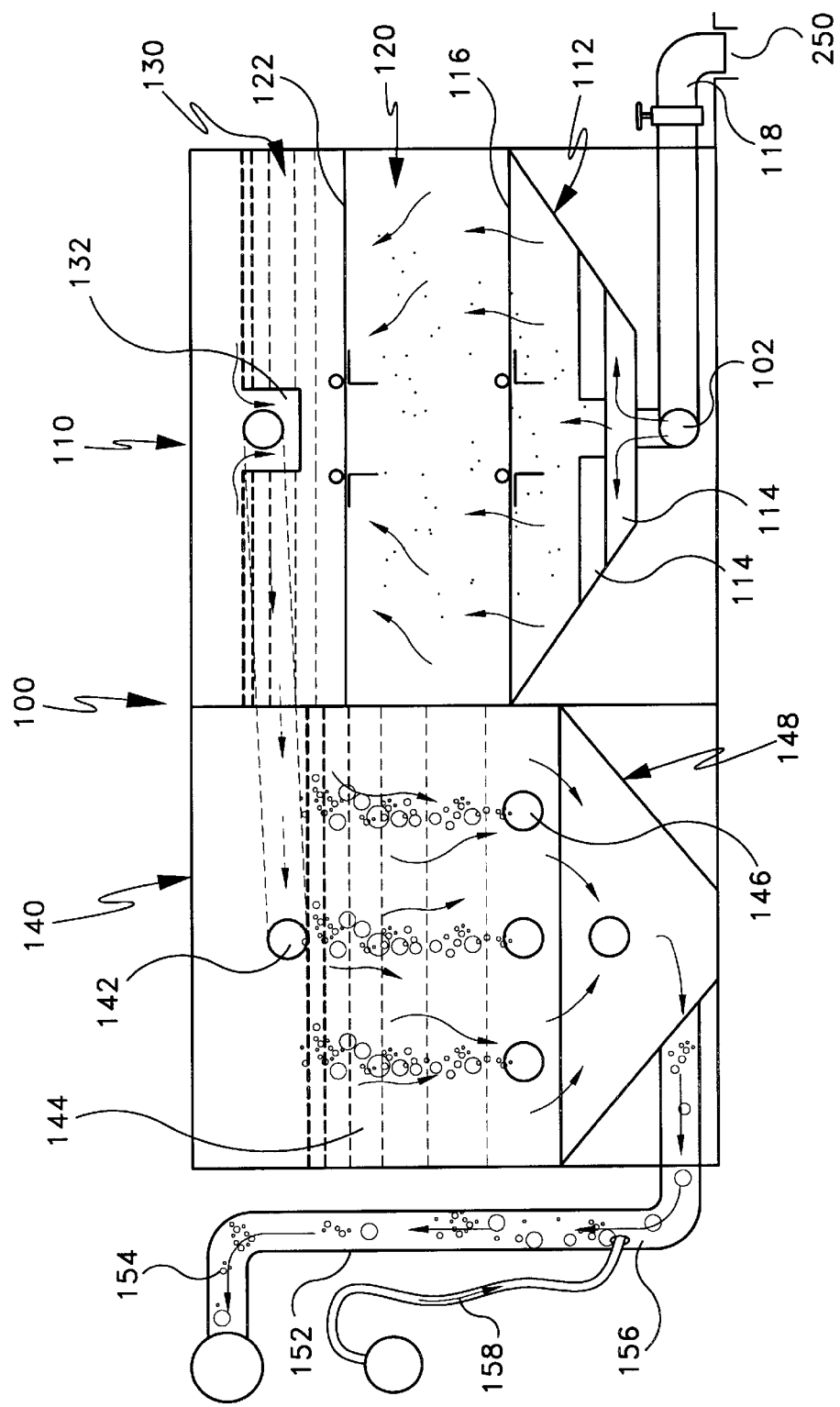
FIG. 3 is a cross sectional view of the water purification unit, as viewed along line 3—3 of FIG. 1.
Figure 4:
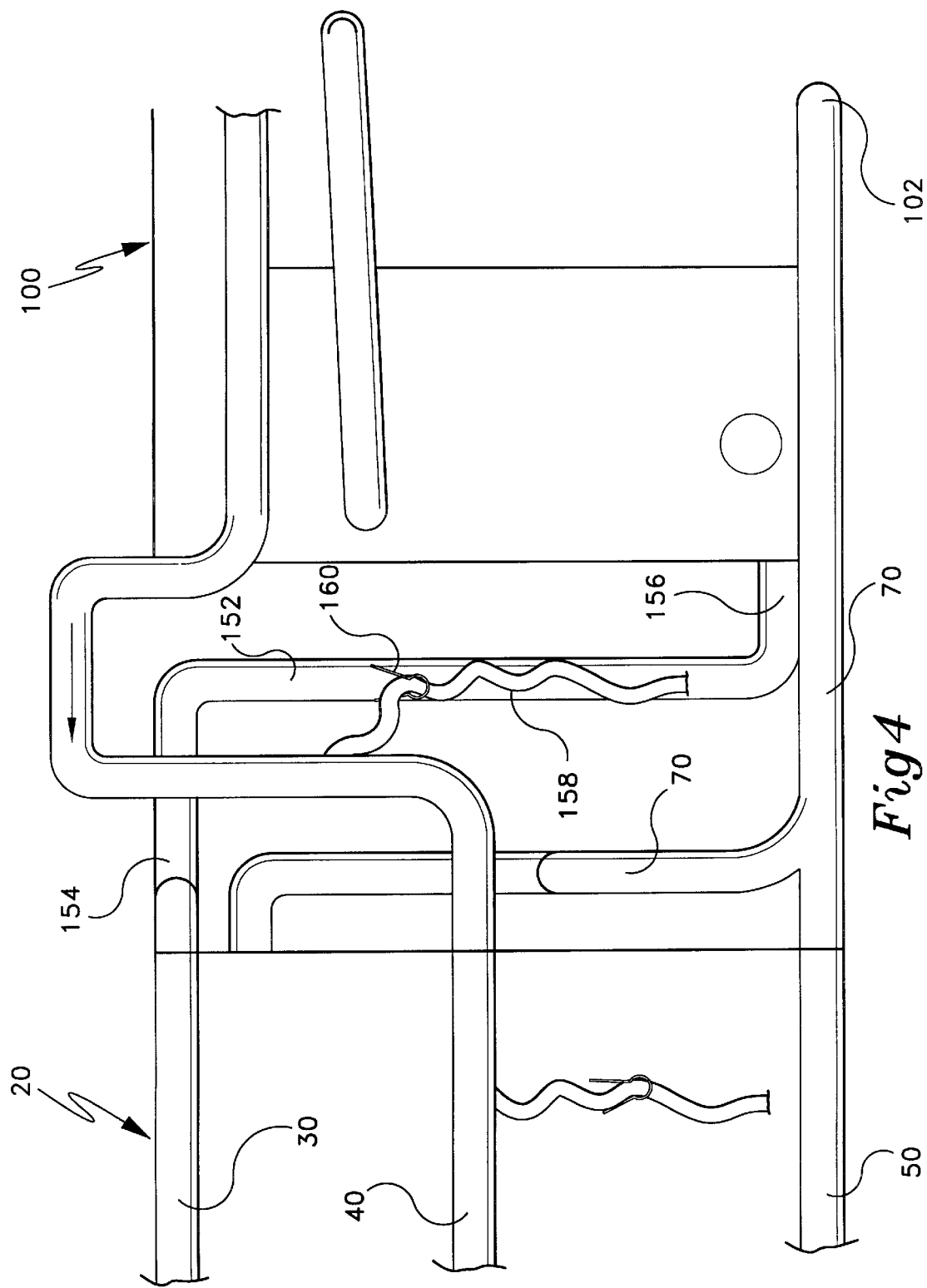
FIG. 4 is a partial, elevational view of the pipework and air lift system connecting the culture tank and water purification unit.

After leaving the culture tank 20, water passes through the waste output pipe 70 and into the water purification unit 100 (detailed in FIG. 3). The waste output pipe 70 is connected to a waste inlet pipe 102 leading to a clarifier compartment 110. Waste water enters a lower sloped region 112, which has a plurality of baffles 114 for slowing the velocity of water entering the clarifier compartment 110. Here, suspended solids are allowed to settle before water flows through a lower screen member 116 which tops the sloped region 112. In a preferred embodiment, the lower screen member 116 is made up of a pair of hinged screens. The lower sloped region 112 is connected to a waste pipe drain 118 with valve, so that settled solids may be drawn into a sewer line 250.

Water travels through the lower screen member 116 into a middle settling region 120, located just above the lower screen member 116. Here additional settling occurs, before the water passes upward through an upper screen member 122, which is also preferably made up of two hinged screen members.

Once the water passes through the upper screen member 122, any further settling is accomplished in an upper runoff region 130. The water rises through this section until it reaches a level that overflows into a clarifier outlet trough which draws water evenly across the surface of the clarifier compartment 110, transferring clarified water from the uppermost layer in the clarifier compartment 110 to a biofilter compartment 140 via gravity.

At this point, the water has been clarified, leaving suspended solids in the clarifier compartment 110. The clarified water enters the biofilter through a sparge arm 142, in fluid communication with said clarifier outlet trough 132. The clarified water is sprayed through the sparge arm 142, over a filter bed 144. In a preferred embodiment, the filter bed 144 uses polyvinyl chloride shavings or PVC ribbons (not shown for clarity) to increase surface area. The filter bed 144, with increased surface area, houses a large amount of the biological organisms needed to convert toxic ammonia first to nitrite and then to, essentially harmless, nitrate. A plurality of air diffusers 146, fluidly connected to an air supply, are placed near the bottom of the filter bed 144 for aerating the water, while dislodging debris from the filter to keep it open for the free flow of water through the filter bed 144 via gravity. A funnel portion 148 at the lower end of the biofilter leads to an air uplift tube system which ultimately returns water to the culture tank 20.

The air uplift tube system is made up of a series of tubes 152, each having an upper portion 154, leading to the water return manifolds 30 of the culture tank 20, and a lower portion 156, connected to the funnel portion 148 of the biofilter 140, thereby connecting the water purification unit 100 and the culture tank 20. A plurality of hoses 158, each having a valve 160, connect a compressed air supply 200 to the lower portion 156 of an uplift tube 152. When the valve 160 is open, air bubbles form a steady stream up through the tube 152, both aerating the water and carrying it upward through the tube 152 to the culture tank water return manifold 30.

In this manner, water is reused and recirculated through a fish tank culture system 10. Water leaves the culture tank 20 full of suspended solids and potentially toxic levels of ammonia, but returns clarified, nitrified, and aerated, allowing for the growth of large numbers of fish in a relatively small volume of water.

It is to be understood that the present invention is not limited to the sole embodiment described above, but encompasses any and all embodiments within the scope of the following claims.

I claim:

1. The fish culturing system, including, wherein:

a culture tank having a water purification unit including a clarifier, a biofilter, using compressed air for operation, and a connecting air uplift tube system said culture tank further comprising:
 a) a flat bottom;
 b) two opposed elongated sides, each having an upper edge and a lower edge, said lower edge being attached to said bottom, wherein each of said elongated sides further comprises;
  i) a water return manifold along said upper edge of said elongated side, wherein said water return manifold fluidly connects to an output flow member of a clean water source and is provided with a plurality slots for forcing water toward the center of said tank, and in opposition to the flow generated by said water return manifold of said opposing elongated side, thereby creating two opposing water flows for pushing floating debris toward the center of the tank;
  ii) an air manifold in fluid connection with a source of compressed air, said air manifolds located exteriorly, at approximately one third the height of said tank;
  iii) a plurality of air diffusers for injecting air into the culture tank and simultaneously creating a circular water flow by carrying water upwards, each of said plurality of air diffusers being in fluid connection with said air manifold via an air pipe with valve, said air diffusers located within the tank, near said bottom and along each elongated side;
  iv) a lateral lower waste output manifold, located on and extending the entire length of the bottom edge of said elongated side with a plurality of open slits for drawing waste materials and waste water to a waste output pipe which fluidly connects said culture tank to the input of a purification unit;
 c) two opposed shorter sides, which connect said opposed elongated sides and said bottom, creating a reservoir for holding water and fish with an open top; and
 d) a suspended central waste overflow manifold in fluid connection with the waste output pipe, said suspended overflow manifold being provided with a plurality of slots for drawing in waste material and water directed by the current pushing from both sides toward the center, and having baffles for directing water flow over the manifold and preventing waste material from escaping the manifold; and
wherein said water purification unit comprises:
 a) a waste inlet pipe, fluidly connecting a waste outlet of a culture tank to said water purification unit;
 b) a tank, having
  i) a clarifier compartment comprising:
   1) a lower sloped region, in fluid connection with said waste inlet pipe, said lower sloped region having a plurality of baffles for slowing the velocity of water entering the clarifier, and for allowing settling of suspended solids, said sloped lower portion topped by a lower screen member, for filtering suspended solids, said lower sloped region connected to a waste pipe drain and valve, for draining settled solids into a sewer line;
   2) a middle settling region, located just above said hinged lower screens;
   3) an upper runoff portion, separated from the middle settling region by an upper screen member, said upper runoff portion being provided with a clarifier outlet trough for drawing and transferring clarified water from the uppermost layer in the clarifier to a biofilter compartment via gravity;
  ii) said biofilter compartment comprising:
   1) a filter bed, with increased surface area for housing bacteria for nitrification;
   2) a sparge arm, in fluid communication with said clarifier outlet trough, for spraying clarified water from the clarifier over said filter bed;
   3) a plurality of air diffusers, fluidly connected to an air supply, for aerating the water, while dislodging debris to keep the filter open for the free flow of water through the filter bed via gravity;
   4) a funnel portion leading to a an air uplift tube system which ultimately return to the culture tank; and
 c) said air uplift tube system comprising:
  i) a series of tubes, each of said tubes having an upper portion, leading to the water return of the culture tank, and a lower portion, connected to said funnel portion of said biofilter, thereby connecting the water purification unit and the culture tank; and
  ii) a plurality of hoses; each hose, having a valve, and connecting a compressed air supply with said lower portion, such that when the valve is open, air bubbles form a steady stream up through said tube, both aerating the water and carrying it upward through the tube to the culture tank water return.

2. The fish culturing system as recited in claim 1, wherein said upper screen member and lower screen member of said clarifier compartment of said water purification unit each comprise a pair of hinged screen members.

3. The fish culturing system as recited in claim 1, wherein said filter bed of said water purification unit comprises a multiplicity of shredded polyvinyl chloride shavings.

4. The fish culturing system as recited in claim 1, wherein said air supply of the water purification unit is a conventional air compressor.

5. The fish culturing system as recited in claim 1, wherein said air supply of the water purification unit is a compressed air tank.

6. The fish culturing system as recited in claim 1, wherein:
    said upper screen member and lower screen member of said clarifier compartment each comprise a pair of hinged screen members;
    said filter bed comprises a multiplicity of shredded polyvinyl chloride shavings; and
    said air supply is a conventional air compressor.

7. The fish culturing system as recited in claim 1, wherein:
    said upper screen member and lower screen member of said clarifier compartment each comprise a pair of hinged screen members;
    said filter bed comprises a multiplicity of shredded polyvinyl chloride shavings; and
    said air supply is a compressed air tank.

8. A water purification unit, in a fish culturing system, said water purification unit comprising:
    a) a waste inlet pipe, fluidly connecting a waste outlet of a culture tank to said water purification unit;
    b) a tank, having
        i) a clarifier compartment comprising:
            1) a lower sloped region, in fluid connection with said waste inlet pipe, said lower sloped region having a plurality of baffles for slowing the velocity of water entering the clarifier, and for allowing settling of suspended solids, said sloped lower portion topped by a lower screen member, for filtering suspended solids, said lower sloped region connected to a waste pipe drain and valve, for draining settled solids into a sewer line;
            2) a middle settling region, located just above said hinged lower screens;
            3) an upper runoff portion, separated from the middle settling region by an upper screen member, said upper runoff portion being provided with a clarifier outlet trough for drawing and transferring clarified water from the uppermost layer in the clarifier to a biofilter compartment via gravity;
        ii) said biofilter compartment comprising:
            1) a filter bed, with increased surface area for housing bacteria for nitrification;
            2) a sparge arm, in fluid communication with said clarifier outlet trough, for spraying clarified water from the clarifier over said filter bed;
            3) a plurality of air diffusers, fluidly connected to an air supply, for aerating the water, while dislodging debris to keep the filter open for the free flow of water through the filter bed via gravity;
            4) a funnel portion leading to a an air uplift tube system which ultimately return to the culture tank; and
    c) said air uplift tube system comprising:
        i) a series of tubes, each of said tubes having an upper portion, leading to the water return of the culture tank, and a lower portion, connected to said funnel portion of said biofilter, thereby connecting the water purification unit and the culture tank; and
        ii) a plurality of hoses, each hose, having a valve, and connecting a compressed air supply with said lower portion, such that when the valve is open, air bubbles form a steady stream up through said tube, both aerating the water and carrying it upward through the tube to the culture tank water return.

9. The water purification unit as recited in claim 8, wherein said upper screen member and lower screen member of said clarifier compartment each comprise a pair of hinged screen members.

10. The water purification unit as recited in claim 8, wherein said filter bed comprises a multiplicity of shredded polyvinyl chloride shavings.

11. The water purification unit as recited in claim 8, wherein said air supply is a conventional air compressor.

12. The water purification unit as recited in claim 8, wherein said air supply is a compressed air tank.

13. The water purification unit as recited in claim 8, wherein:
    said upper screen member and lower screen member of said clarifier compartment each comprise a pair of hinged screen members;
    said filter bed comprises a multiplicity of shredded polyvinyl chloride shavings; and
    said air supply is a conventional air compressor.

14. The water purification unit as recited in claim 8, wherein:
    said upper screen member and lower screen member of said clarifier compartment each comprise a pair of hinged screen members;
    said filter bed comprises a multiplicity of shredded polyvinyl chloride shavings; and
    said air supply is a compressed air tank.

15. A culture tank in a fish culturing system, wherein said culture tank comprises:
    a) a flat bottom;
    b) two opposed elongated sides, each having an upper edge and a lower edge, said lower edge being attached to said bottom, wherein each of said elongated sides further comprises;
        i) a water return manifold along said upper edge of said elongated side, wherein said water return manifold
            1) fluidly connects to an output flow member of a clean water source; and
            2) is provided with a plurality slots for forcing water toward the center of said tank, and in opposition to the flow generated by said water return manifold of said opposing elongated side, thereby creating two opposing water flows for pushing floating debris toward the center of the tank;
        ii) an air manifold in fluid connection with a source of compressed air, said air manifolds located exteriorly, at approximately one third the height of said tank;
        iii) a plurality of air diffusers for injecting air into the culture tank and simultaneously creating a circular water flow by carrying water upwards, each of said plurality of air diffusers being in fluid connection with said air manifold via an air pipe with valve, said air diffusers located within the tank, near said bottom and along each elongated side;

iii) a lateral lower waste output manifold, located on and extending the entire length of the bottom edge of said elongated side with a plurality of open slits for drawing waste materials and waste water to a waste output pipe which fluidly connects said culture tank to the input of a purification unit;

c) two opposed shorter sides, which connect said opposed elongated sides and said bottom, creating a reservoir for holding water and fish with an open top; and d) a suspended central waste overflow manifold in fluid connection with the waste output pipe, said suspended overflow manifold being provided with a plurality of slots for drawing in waste material and water directed by the current pushing from both sides toward the center, and having baffles for directing water flow over the manifold and preventing waste material from escaping the manifold.

* * * * *